US009843975B2

(12) United States Patent
Roeland et al.

(10) Patent No.: US 9,843,975 B2
(45) Date of Patent: Dec. 12, 2017

(54) METHOD AND APPARATUS FOR ESTABLISHING A PDN CONNECTION

(75) Inventors: Dinand Roeland, Sollentuna (SE); Zu Qiang, Kirkland (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 854 days.

(21) Appl. No.: 14/000,137

(22) PCT Filed: Feb. 17, 2011

(86) PCT No.: PCT/EP2011/052375
§ 371 (c)(1),
(2), (4) Date: Oct. 28, 2013

(87) PCT Pub. No.: WO2012/110093
PCT Pub. Date: Aug. 23, 2012

(65) Prior Publication Data
US 2014/0044098 A1 Feb. 13, 2014

(51) Int. Cl.
*H04W 4/00* (2009.01)
*H04W 36/22* (2009.01)
(Continued)

(52) U.S. Cl.
CPC ......... *H04W 36/22* (2013.01); *H04W 76/022* (2013.01); *H04L 61/2015* (2013.01); *H04W 36/0022* (2013.01); *H04W 36/14* (2013.01)

(58) Field of Classification Search
CPC .................................................. H04W 76/022
(Continued)

(56) References Cited

U.S. PATENT DOCUMENTS 8,369,284 B2* 2/2013 Parsons ............. H04W 36/0033
370/331
8,559,392 B2* 10/2013 Ramankutty ..... H04W 36/0033
370/331
(Continued)

FOREIGN PATENT DOCUMENTS

WO 2009118661 A2 10/2009
WO 2010016241 A1 2/2010
(Continued)

OTHER PUBLICATIONS

3rd Generation Partnership Project; Technical Specification Group Services and System Aspects; Architecture enhancements for non-3GPP accesses (Release 10), 3GPP Standard; 3GPP TS 23.402, 3rd Generation Partnership Project (3GPP), Mobile Competence Centre, V10.2.1, 2011, 228 pages.
(Continued)

*Primary Examiner* — Guang Li
(74) *Attorney, Agent, or Firm* — Rothwell, Figg, Ernst & Manbeck, P.C.

(57) ABSTRACT

A method for use in establishing a packet data network, PDN, connection from a user equipment or UE, to a 3GPP core network via a non-3GPP access network. The method comprises receiving at the non-3GPP access network a request to establish the PDN connection; communicating with the 3GPP core network to establish a tunnel for the PDN connection between the non-3GPP access network and the 3GPP core network and to assign an IP address for the tunnel, which tunnel IP address is used subsequently by the non-3GPP access network to distinguish between the new PDN connection tunnel and at least one other such PDN connection tunnel already established for the UE, wherein the 3GPP core network is responsible for assigning the IP
(Continued)

address, and sending address information from the non-3GPP access network to the 3GPP core network.

15 Claims, 11 Drawing Sheets

(51) Int. Cl.
  *H04W 76/02* (2009.01)
  *H04W 36/00* (2009.01)
  *H04W 36/14* (2009.01)
  *H04L 29/12* (2006.01)
(58) Field of Classification Search
  USPC .......................................................... 370/331
  See application file for complete search history.

(56) References Cited

U.S. PATENT DOCUMENTS

| | | | | |
|---|---|---|---|---|
| 8,582,529 | B2* | 11/2013 | Shaheen | H04W 36/0033 370/331 |
| 8,599,790 | B1* | 12/2013 | Damle | H04W 76/022 370/331 |
| 2008/0310358 | A1* | 12/2008 | Shaheen | H04W 48/14 370/329 |
| 2008/0316972 | A1* | 12/2008 | Shaheen | H04W 36/0033 370/331 |
| 2009/0016300 | A1* | 1/2009 | Ahmavaara | H04W 36/0072 370/331 |
| 2009/0207812 | A1* | 8/2009 | Gupta | H04W 36/0094 370/332 |
| 2009/0279515 | A1* | 11/2009 | Cheon | H04W 36/0033 370/338 |
| 2009/0303966 | A1* | 12/2009 | Cherian | H04W 36/0016 370/331 |
| 2009/0310581 | A1* | 12/2009 | Lansisalmi | H04W 76/022 370/338 |
| 2010/0035578 | A1* | 2/2010 | Ahmed | H04W 12/06 455/411 |
| 2010/0054207 | A1* | 3/2010 | Gupta | H04W 36/14 370/331 |
| 2010/0195493 | A1* | 8/2010 | Hedman | H04L 63/1458 370/230 |
| 2010/0199332 | A1* | 8/2010 | Bachmann | H04L 63/0428 726/4 |
| 2010/0208704 | A1* | 8/2010 | Wu | H04L 12/66 370/331 |
| 2010/0284336 | A1* | 11/2010 | Rui | H04L 12/14 370/328 |
| 2010/0323700 | A1* | 12/2010 | Bachmann | H04W 36/0066 455/436 |
| 2011/0099604 | A1* | 4/2011 | Zhou | H04L 12/14 726/1 |
| 2011/0134869 | A1* | 6/2011 | Hirano | H04L 29/12311 370/329 |
| 2011/0216743 | A1* | 9/2011 | Bachmann | H04L 63/164 370/331 |
| 2011/0261787 | A1* | 10/2011 | Bachmann | H04L 63/029 370/331 |
| 2012/0014352 | A1* | 1/2012 | Giaretta | H04W 76/021 370/331 |
| 2012/0039323 | A1* | 2/2012 | Hirano | H04W 36/385 370/338 |
| 2012/0076121 | A1* | 3/2012 | Choi | H04W 76/062 370/338 |
| 2012/0099561 | A1* | 4/2012 | Zhao | H04W 36/023 370/331 |
| 2012/0147839 | A1* | 6/2012 | Yin | H04W 76/025 370/329 |
| 2012/0265888 | A1* | 10/2012 | Roeland | H04L 12/14 709/228 |
| 2013/0005332 | A1* | 1/2013 | Sedlacek | H04W 12/06 455/426.1 |
| 2013/0078998 | A1* | 3/2013 | Rui | H04L 63/20 455/426.1 |
| 2015/0350983 | A1* | 12/2015 | Kwok | H04L 65/1069 370/331 |

FOREIGN PATENT DOCUMENTS

| | | |
|---|---|---|
| WO | 2010039085 A1 | 4/2010 |
| WO | WO 2010145124 A1 * 12/2010 | ............. H04L 12/14 |

OTHER PUBLICATIONS

3rd Generation Partnership Project; Technical Specification Group Services and System Aspects; Study on Support of BBF Access Interworking (Release 11), 3GPP Standard; 3GPP TS 23.839, 3rd Generation Partnership Project (3GPP), Mobile Competence Centre, V0.4.0, 2010, 105 pages.
3rd Generation Partnership Project; Technical Specification Group Services and System Aspects; Study on Support of BBF Access Interworking (Release 11), 3GPP Standard; 3GPP TS 23.839 V0.4. 0, 2011, 105 pages.
3rd Generation Partnership Project; Technical Specification Group Services and System Aspects; Architecture enhancements for non-3GPP accesses (Release 10), 3GPP Standard; 3GPP TS 23.402 V10.2.1, 2011, 228 pages.
Broadband forum, working text, (Draft) WT-203 Interworking between Next Generation Fixed and 3GPP Wireless Access, Revisions 7, 2011, 50 pages.

* cited by examiner

FIG. 7

| Octets | Bits | | | | | | | |
|---|---|---|---|---|---|---|---|---|
| | 8 | 7 | 6 | 5 | 4 | 3 | 2 | 1 |
| 1 | Type = xx (decimal) | | | | | | | |
| 2 to 3 | Length = n | | | | | | | |
| 4 | Spare | | | | Instance | | | |
| 5 | Number of Assigned IP Address = m | | | | | | | |
| 6 to 9 | Assigned IP Address 1 | | | | | | | |
| | ... | | | | | | | |
| w to (w+4) | Assigned IP Address m | | | | | | | |

FIG. 8

| Octets | Bits | | | | | | | |
|---|---|---|---|---|---|---|---|---|
| | 8 | 7 | 6 | 5 | 4 | 3 | 2 | 1 |
| 1 | Type = 19 | | | | | | | |
| 2 | Length = n | | | | | | | |
| 3 - 6 | Vendor Id = 10415 | | | | | | | |
| 7 | Sub-Type = xx | | | | | | | |
| 8 | Reserved | | | | | | | |
| 9 | Number of Assigned IP Address = m | | | | | | | |
| 10 - 13 | Assigned IP Address 1 | | | | | | | |
| | ...... | | | | | | | |
| w to (w+4) | Assigned IP Address m | | | | | | | |

METHOD AND APPARATUS FOR ESTABLISHING A PDN CONNECTION

CROSS REFERENCE TO RELATED APPLICATION(S)

This application is a 35 U.S.C. §371 National Phase Entry Application from PCT/EP2011/052375, filed Feb. 17, 2011, designating the United States, the disclosure of which is incorporated herein in its entirety by reference.

TECHNICAL FIELD

The present invention relates to a method and apparatus relating to a scheme in which a mobile terminal is connected to a 3GPP core network (or equivalent) via a non-3GPP (or equivalent) access network. The present invention finds particular use in establishing a packet data network connection from a user equipment to a 3GPP core network via a non-3GPP access network. The method finds particular use in Fixed Mobile Convergence.

BACKGROUND

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. By FMC, mobile and fixed network operators will be able to utilize their network resource more efficiently, which leads to reduction of capital and operational expenditure (CAPEX and OPEX). For instance, when a user is running an IP-based application such as Multimedia Telephony (MMTel) inside their home, it is more efficient to utilize broadband connectivity of the fixed access network rather than the wireless access network.

Residential networks are a key to the success of FMC because they are the most commonly used fixed network access by ordinary users. Therefore, it is important to be able to connect mobile phones to the Evolved Packet Core (EPC; see "Architecture enhancements for non-3GPP Accesses," 3GPP TS 23.402, V8.2.0, 2008-06) through a residential network. The term User Equipment (UE) can be used in place of the term mobile terminal or mobile phone; the term UE is familiar in the 3rd Generation Partnership Project (3GPP) documentation.

3GPP defines mobile 2G/3G/LTE accesses and "non-3GPP accesses" (TS 23.402). The latter can be a fixed network. The BBF (BroadBand Forum, the standardization organization for the fixed access; see http://www.broadband-forum.org/) defines an architecture for fixed networks. Many UEs address the FMC trend by providing multiple radio interfaces: one interface to connect to a 2G/3G/LTE access and a WiFi interface to connect to a fixed network.

There is an ongoing joint work item on FMC between these two organizations [3GPP TR 23.839 and BBF WT 203]. A 3GPP UE can attach to a BBF access network and connect to one or more Packet Data Networks (PDNs) via the S2 interface [3GPP TS 23.402]. FIG. 1 of the accompanying drawings is a schematic block diagram providing an architecture overview, illustrating a UE 2 connecting to a 3GPP domain 4 via a BBF domain 6. The BBF domain 4 comprises a Residential Gateway (RG) 8, an Access Node 10 and a Border Network Gateway (BNG) 12. The 3GPP domain 4 comprises one or more PDN Gateways (PGWs) 14.

The S2 interface comes in three types: S2a, S2b and S2c. The latter two overlay the BBF network and do not impact the BBF. S2a is a more converged solution that does impact BBF nodes.

In S2a, there is a GPRS Tunnelling Protocol (GTP) or Proxy Mobile IP (PMIP) tunnel for each PDN connection between the BBF BNG and the 3GPP PGW(s). Each PDN connection is anchored in a 3GPP PGW. The UE receives one IP address for each PDN connection, and it is the PGW that assigns the address. Between the UE 2 and the BNG 12 a point-to-point link is provided in order to separate the traffic from the different PDN connections.

Such a point-to-point link can be implemented in several ways. An assumption can be made that the network between the UE 2 and the BNG 12 is Ethernet-based. All nodes intermediate the UE 2 and the BNG 12 do forced-forwarding towards the BNG 12 on L2 (Ethernet). The BNG 12 sends downstream traffic targeted for the UE 2 as unicast on L2, even if that traffic is multicast/broadcast on L3 (IP).

Such an implementation imposes a limited impact on the UE 2 and the existing BBF infrastructure. More importantly, there is no impact to the UE 2 if the UE 2 only has one default PDN connection. The BNG 12 can distinguish the different PDN connections based on UE MAC address combined with the PDN connection IP address that was assigned to the UE 2.

There are other ways to implement a point-to-point link between the UE 2 and BNG 12. Examples are: a L3 tunnel (e.g. IPsec or IP-in-IP), a L2 tunnel (e.g. L2TP), and so on. However, all of these tend to have a greater impact on the UE 2 or the BBF infrastructure.

The present applicant has appreciated a problem with the above-described architecture. In particular, it has been appreciated that there could be a situation where a set of one or more PGWs assign the same IP address for different PDN connections. This could occur where, for example, there are two PDNs connections relating respectively to two closed corporate networks, each with their own addressing scheme. Each PDN might be served by a different PGW, and each PGW might be managed by a different operator. The 3GPP domain(s) and the UE are designed to handle such an overlap without any issue. However, the problem is that the BNG will get confused; it will no longer be able to map upstream traffic to the correct GTP/PMIP tunnel.

It should perhaps be noted that the likelihood of such a problem occurring in a real deployment is small; most UEs will only use a single PDN connection, and the IP addressing schemes of different PDNs will in most cases not overlap. However, the problem can and will occur without a solution, and the present applicant has appreciated the desirability of addressing this issue.

SUMMARY

A method is proposed here involving the connecting of a mobile terminal or UE to a 3GPP core network, such as the Evolved Packet Core, via a non-3GPP access network, such as a BBF network or domain. The method finds use in a Fixed Mobile Convergence scheme, where the mobile terminal or UE connects to the 3GPP core network through a fixed residential network, for example using WiFi.

A method is particularly proposed here for establishing a packet data network or PDN connection from a UE to a 3GPP core network via a non-3GPP access network, and for dealing with a situation where an existing PDN connection is handed over from a 3GPP access network to the non-3GPP access network.

According to a first aspect of the present invention there is provided a method for use in establishing a packet data network, PDN, connection from a user equipment, UE, to a 3GPP core network via a non-3GPP access network, the method comprising: receiving at the non-3GPP access network a request to establish the PDN connection; communicating with the 3GPP core network to establish a tunnel for the PDN connection between the non-3GPP access network and the 3GPP core network and to assign an IP address for the tunnel, which tunnel IP address is used subsequently by the non-3GPP access network to distinguish between the new PDN connection tunnel and at least one other such PDN connection tunnel already established for the UE, wherein the 3GPP core network is responsible for assigning the IP address, and comprising sending address information from the non-3GPP access network to the 3GPP core network as part of the communicating step, the address information enabling the 3GPP core network to assign an IP address for the new PDN connection tunnel that does not clash with an IP address already assigned to any of the at least one another such PDN connection tunnel.

The address information may comprise at least one IP address not to be assigned by the 3GPP core network to the new tunnel, or at least information enabling the at least one IP address to be determined by the 3GPP core network.

The method may comprise determining at the non-3GPP access network which IP addresses have already been assigned to or which are already in use by the at least one another such tunnel, and wherein the at least one IP address comprises the determined IP addresses or at least information enabling those IP addresses to be determined by the 3GPP core network.

The address information may comprise at least one IP address from which the 3GPP core network should choose to assign to the new tunnel, or at least information enabling the at least one IP address to be determined by the 3GPP core network.

The method may comprise receiving at the non-3GPP access network a request to hand over an existing PDN connection for the UE from a 3GPP access network to the non-3GPP access network, determining at the non-3GPP access network whether the IP address of the PDN connection being handed over clashes with an IP address already assigned to a PDN connection for the UE via the non-3GPP access network, and if a clash is not detected then establishing a handed-over PDN connection via the non-3GPP access network using the IP address of the PDN connection being handed over.

If a clash is detected then the method may comprise rejecting the handover request.

If a clash is detected then the method may comprise communicating with the 3GPP core network to establish a handed-over PDN connection via the non-3GPP access network without preservation of the IP address of the PDN connection being handed over.

The communicating step may comprise sending address information from the non-3GPP access network to the 3GPP core network, the address information enabling the 3GPP core network to assign an IP address for the handed-over PDN connection that does not clash with an IP address already assigned to a PDN connection for the UE via the non-3GPP access network.

The steps performed at the non-3GPP access network may be performed by a gateway node of the non-3GPP access network, and wherein the steps performed at the 3GPP core network are performed by a gateway node of the 3GPP network.

The non-3GPP access network may be a BroadBand Forum, BBF, network.

The non-3GPP gateway node may be a Border Network Gateway node of the BBF network.

The 3GPP gateway node may be a PDN Gateway node of the 3GPP core network.

According to a second aspect of the present invention there is provided an apparatus for use in establishing a packet data network, PDN, connection from a user equipment, UE, to a 3GPP core network via a non-3GPP access network, the apparatus comprising: means (or a processing unit) for receiving at the non-3GPP access network a request to establish the PDN connection; means (or a processing unit) for communicating with the 3GPP core network to establish a tunnel for the PDN connection between the non-3GPP access network and the 3GPP core network and to assign an IP address for the tunnel, which tunnel IP address is used subsequently by the non-3GPP access network to distinguish between the new PDN connection tunnel and at least one other such PDN connection tunnel already established for the UE, wherein the 3GPP core network is responsible for assigning the IP address, means (or a processing unit) for sending address information from the non-3GPP access network to the 3GPP core network, the address information enabling the 3GPP core network to assign an IP address for the new PDN connection tunnel that does not clash with an IP address already assigned to any of the at least one another such PDN connection tunnel.

According to a third aspect of the present invention there is provided a method for use in conjunction with a method according to the first aspect of the present invention, comprising communicating with the non-3GPP access network to establish a tunnel for the PDN connection between the non-3GPP access network and the 3GPP core network and to assign an IP address for the tunnel, which tunnel IP address is used subsequently by the non-3GPP access network to distinguish between the new PDN connection tunnel and at least one other such PDN connection tunnel already established for the UE, wherein the 3GPP core network is responsible for assigning the IP address, and comprising receiving address information from the non-3GPP access network as part of the communicating step, and using the address information to assign an IP address for the new PDN connection tunnel that does not clash with an IP address already assigned to any of the at least one another such PDN connection tunnel.

According to a fourth aspect of the present invention there is provided an apparatus for use in conjunction with an apparatus according to the second aspect of the present invention, comprising means (or a processing unit) for communicating with the non-3GPP access network to establish a tunnel for the PDN connection between the non-3GPP access network and the 3GPP core network and to assign an IP address for the tunnel, which tunnel IP address is used subsequently by the non-3GPP access network to distinguish between the new PDN connection tunnel and at least one other such PDN connection tunnel already established for the UE, wherein the 3GPP core network is responsible for assigning the IP address, and means (or a processing unit) for receiving address information from the non-3GPP access network, and means (or a processing unit) for using the address information to assign an IP address for the new PDN connection tunnel that does not clash with an IP address already assigned to any of the at least one another such PDN connection tunnel.

An embodiment of the present invention relates to steps performed at (and means or apparatus for performing those steps in) a node such as a gateway node in the non-3GPP access network and to steps performed at (and means or apparatus for performing those steps in) a node such as a gateway node in the 3GPP core network.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

BRIEF DESCRIPTION OF THE DRAWINGS

FIG. 7 illustrates one possible implementation of a GTP assigned IP address hint information element;

FIG. 8 illustrates one possible implementation of a PMIP assigned IP address hint information element;

DETAILED DESCRIPTION

Referring again to the above-identified problem of overlapping or clashing addresses when a UE access a 3GPP network via a BBF access network, there are typically two scenarios where such a problem can arise. In both scenarios, a dual-radio UE is assumed; the UE has one radio interface for the 3GPP access (e.g. LTE), and one radio interface for the BBF access (e.g. WiFi).

Figure 1:
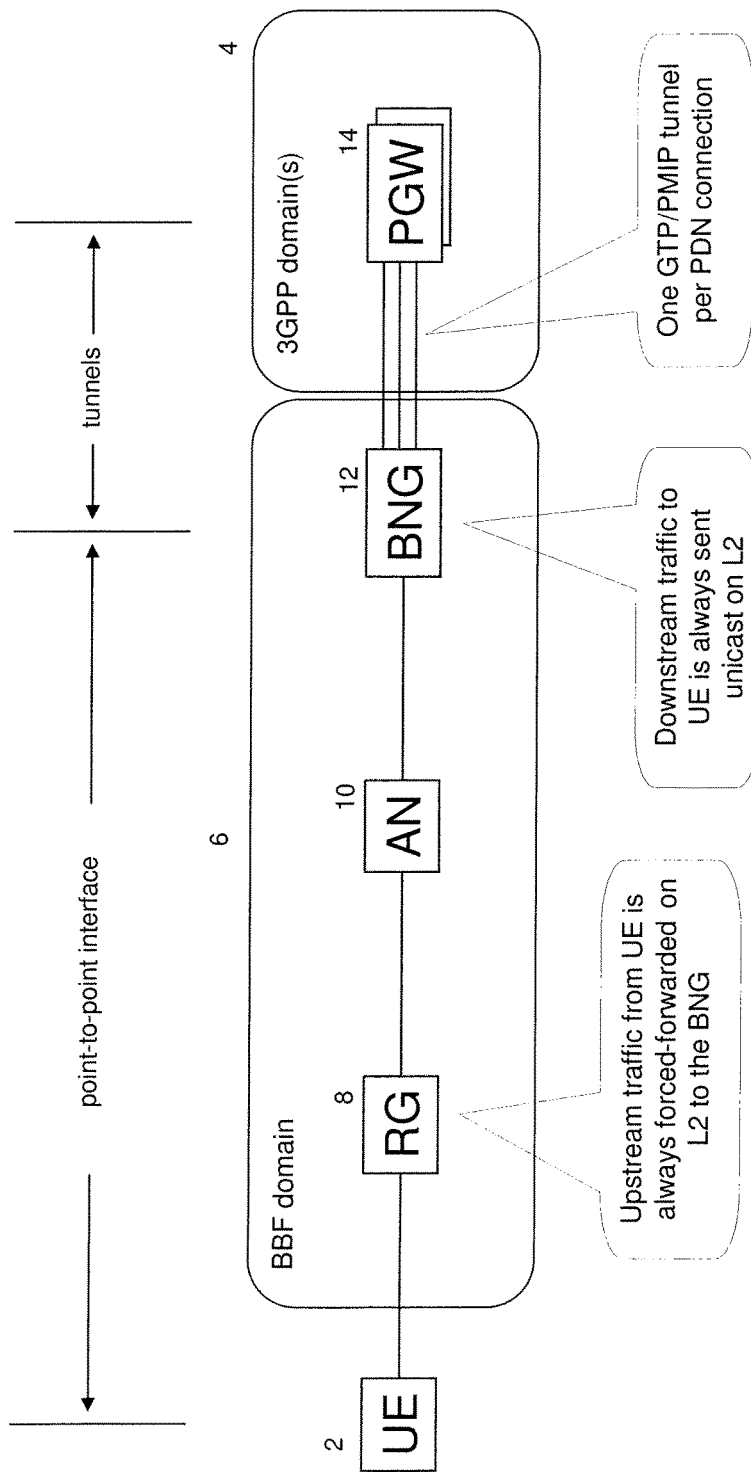
FIG. 1, discussed hereinbefore, is a schematic block diagram providing an architecture overview in which point-to-point links are provided between UE and BNG, and tunnels between BNG and PGW.
Figure 2:
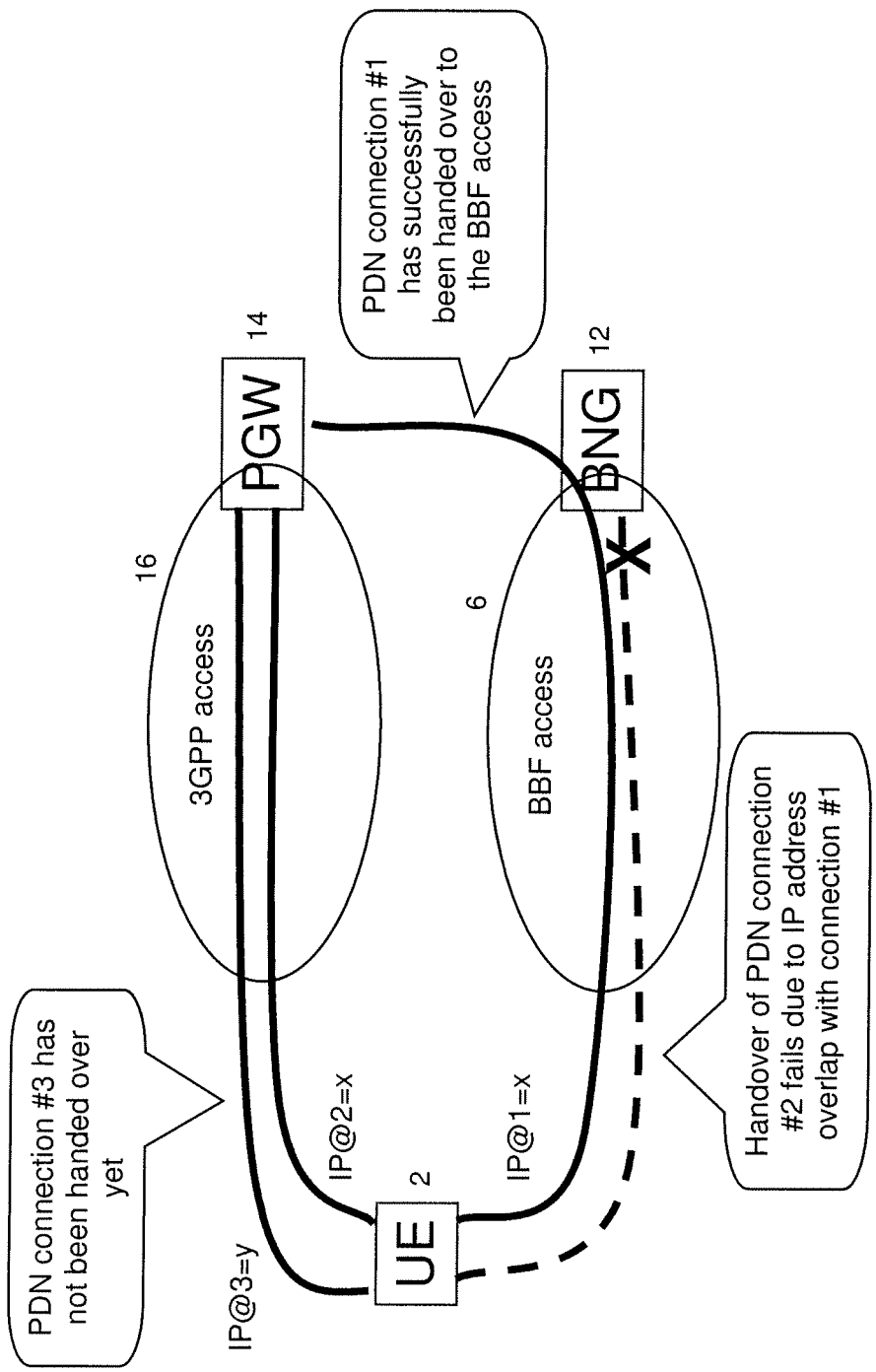
FIG. 2 is a schematic illustration of a UE handing over three PDN connections from a 3GPP access to the a non-3GPP (in this example, BBF) access.

A first scenario is illustrated schematically in FIG. 2. In the first scenario, the UE 2 is initially connected to a 3GPP access 16, and already has overlapping addresses in the 3GPP access 16, or has an address in the 3GPP access 16 which overlaps with an address already assigned in the BBF access 6. As mentioned previously, overlapping addresses in the 3GPP access presents no problem; 3GPP by design allows for such a situation. However, a problem occurs when the UE now does a handover to the BBF access 6. This can be considered as the first scenario.

In a second scenario, the UE 2 is attached to a BBF access 6 and opens a new PDN connection. The new address for that PDN connection overlaps with an existing address in the second scenario.

An embodiment of the present invention offers a solution which addresses the problems identified both in respect of the first scenario and the second scenario.

In the first scenario, the UE 2 hands over its PDN connections one by one to the BBF access 6. As part of the handover signaling towards the BNG 12, the UE 2 indicates the address it had on the 3GPP access 16. If the BNG 12 detects an overlapping or clashing address, the BNG could simply deny the handover or indicate to the UE that there is a problem in granting the handover with IP address preservation. According to an embodiment of the present invention, the UE 2 has a choice either to keep that particular PDN connection on the 3GPP access 16 or to hand over to the BBF access 6, indicating that IP address preservation is not required. The latter gives rise to or can be considered as being equivalent to the second scenario, there being an IP address clash in the BBF access 6.

This can be illustrated with reference to FIG. 2. In FIG. 2, the UE 2 has three PDN connections. PDN connection #1 is via the BBF access 6, while the second and third PDN connections #2 and #3 are via the 3GPP access 16. PDN connections #1 and #2 have an overlapping or clashing IP address, both being assigned IP address 'x'. PDN connection #3 is assigned IP address 'y'.

It is possible to hand over PDN connection #3 from the 3GPP access 16 to the BBF access 6 with IP address preservation, since the IP address for PDN connection #3 does not clash with the IP address for PDN connection #1.

However, handover of the PDN connection #2 with IP address preservation would fail. In such a situation, according to an embodiment of the present invention the UE 2 could then choose to hand over PDN connection #2 without IP address preservation.

An embodiment of the present invention also proposes a solution to the problem associated with scenario 2, which is to deal with the issue of potential IP clashes in the BBF access 6. To deal with scenario 2, an embodiment of the present invention proposes to avoid overlapping or clashing addresses within the BBF access 6 by allowing the BNG 12 to provide "hints" to the PGW 14 about address assignment (these address hints are also referred to herein as "address information").

Figure 3:
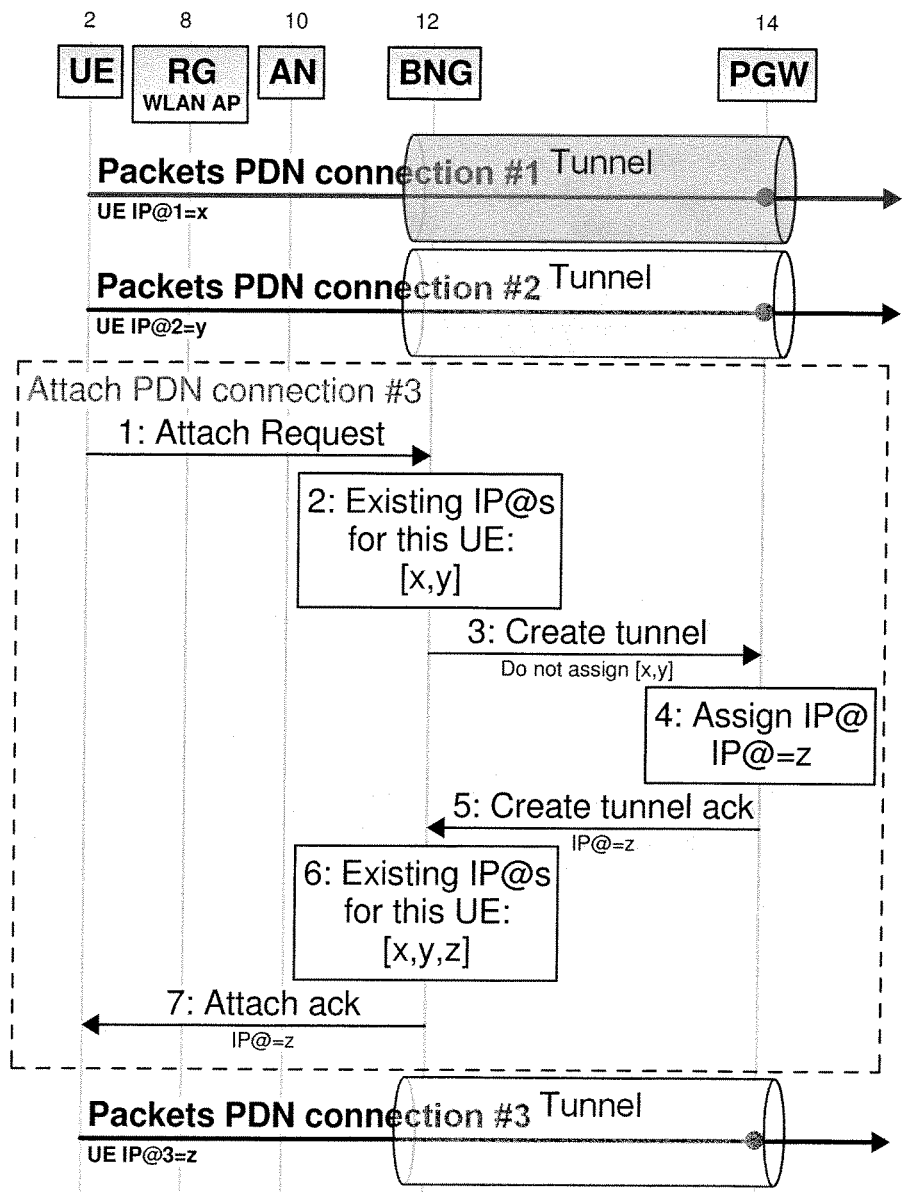
FIG. 3 is a signaling diagram (including actions taken) in a situation where a UE opens a new PDN connection.

A signaling diagram illustrating how scenario 2 is handled according to an embodiment of the present invention is provided in FIG. 3.

In the particular example illustrated in FIG. 3, the UE 2 starts by having two open PDN connections: #1 and #2. The addresses assigned to these PDN connections are x and y respectively.

In step 1, the UE 2 sends an attach request to the BNG 12, indicating to the BBF access 6 that it wants to open a new PDN connection; this request message is received by the BNG 12. There is no flag contained in the request message which indicates that IP address preservation is required.

In step 2, the BNG 12 determines or looks up the addresses of the existing PDN connections for this UE 2, and determines that IP addresses x and y have already been assigned.

In step 3, the BNG 12 sends a create tunnel request to the PGW 12; the requested tunnel will ultimately carry packets for the new PDN connection. As part of the create tunnel request, the BNG 12 provides hints to the PGW 14 regarding IP address assignment. In this particular example, the BNG 12 requests the PGW 14 not to assign x or y to the new PDN connection. The create tunnel request is received at the PGW 12.

In step 4, the PGW 14 assigns an IP address, taking account of the hints it received in the previous step as restrictions. In this particular example, it chooses IP address z.

In step 5 the PGW 14 sends the assigned IP address back to the BNG 12, in this example in a create tunnel acknowledgment message, and this message is received at the BNG 12. In step 6, the BNG 12 updates its record of IP addresses assigned to this UE 2, and in step 7 forwards the new IP address to the UE in an attach acknowledgement message, which message is received by the UE 2.

The basic messages illustrated in the flow chart of FIG. 3 are already part of the 3GPP specifications [3GPP TR 23.839, 3GPP TS 23.402]. The novelty provided in an embodiment of the present invention relates mainly to the address determination made in step 2, the hints provided in step 3, and the assignment of the address according to those hints in step 4.

Although an embodiment of the present invention is presented in FIG. 3 in the context of a very specific 3GPP-BBF interworking scenario, the underlying concept can also be generalized to suit a broader context.

For example, instead of provided hints on which addresses to avoid, the BNG could give hints concerning preferable IP address blocks from which the PGW should select. This could facilitate arrangements where BNGs have their own address pool, which is a subset of a larger address range that is served by a PGW.

Also, instead of the tunnel setup request coming from the BNG 12, there could be other architectural setups, for example a tunnel from another entity to the PGW 14. Such other entity could reside in the BBF domain 6 (e.g. the RG 8) or in some other domain.

In addition, instead of carrying the IP address assignments hints in a GTP or PMIP tunnel setup signal, the concept could be generalized to provide such hints also in other protocols that cater for IP address assignments. One such protocol could be Dynamic Host Configuration Protocol (DHCP). The PGW 14 can be generalized to be any server performing IP address assignment.

Figure 4:
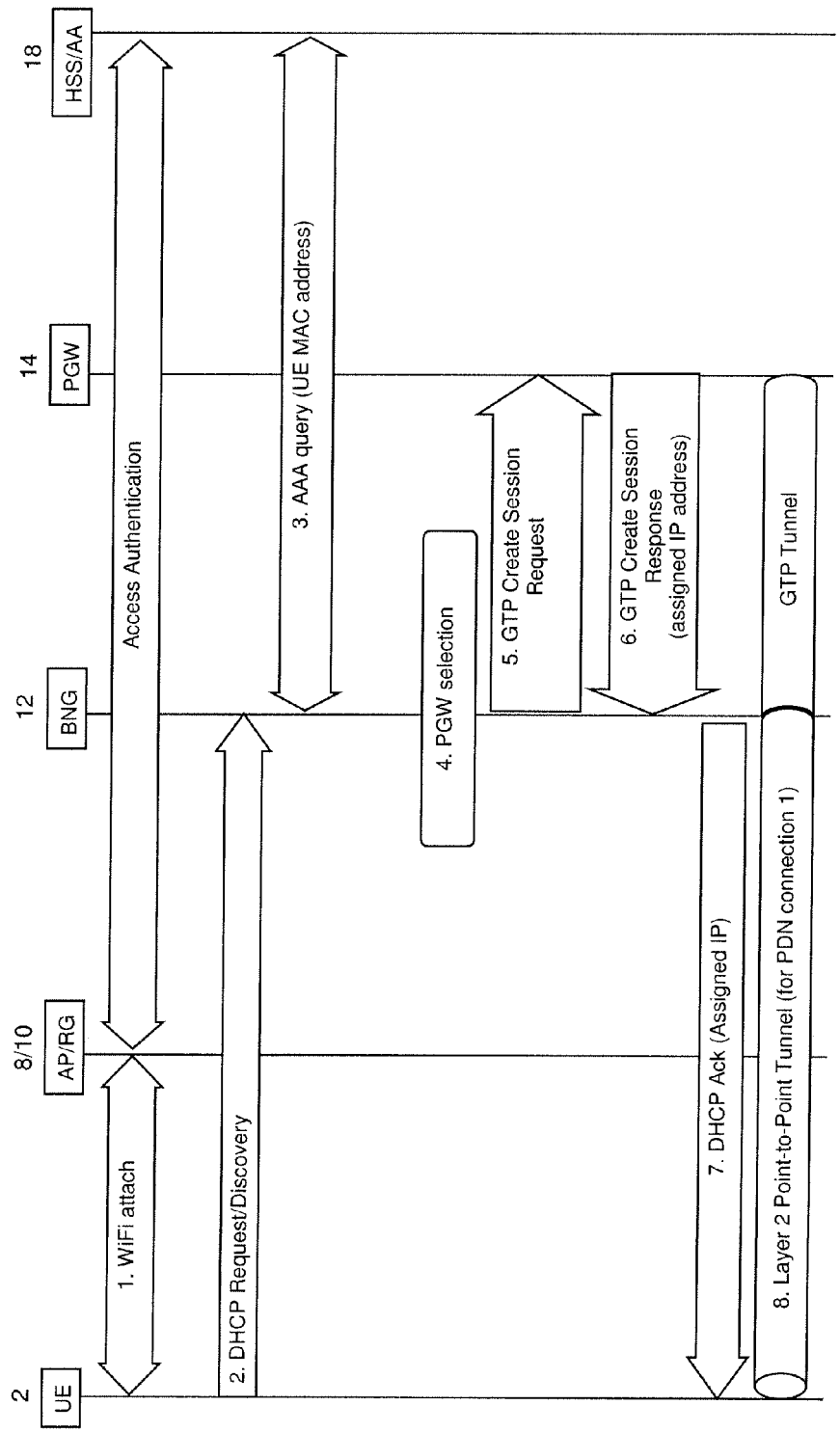
FIG. 4 is a signaling diagram (including actions taken) relating to the setting up of an initial PDN connection over a BBF access.
Figure 5:
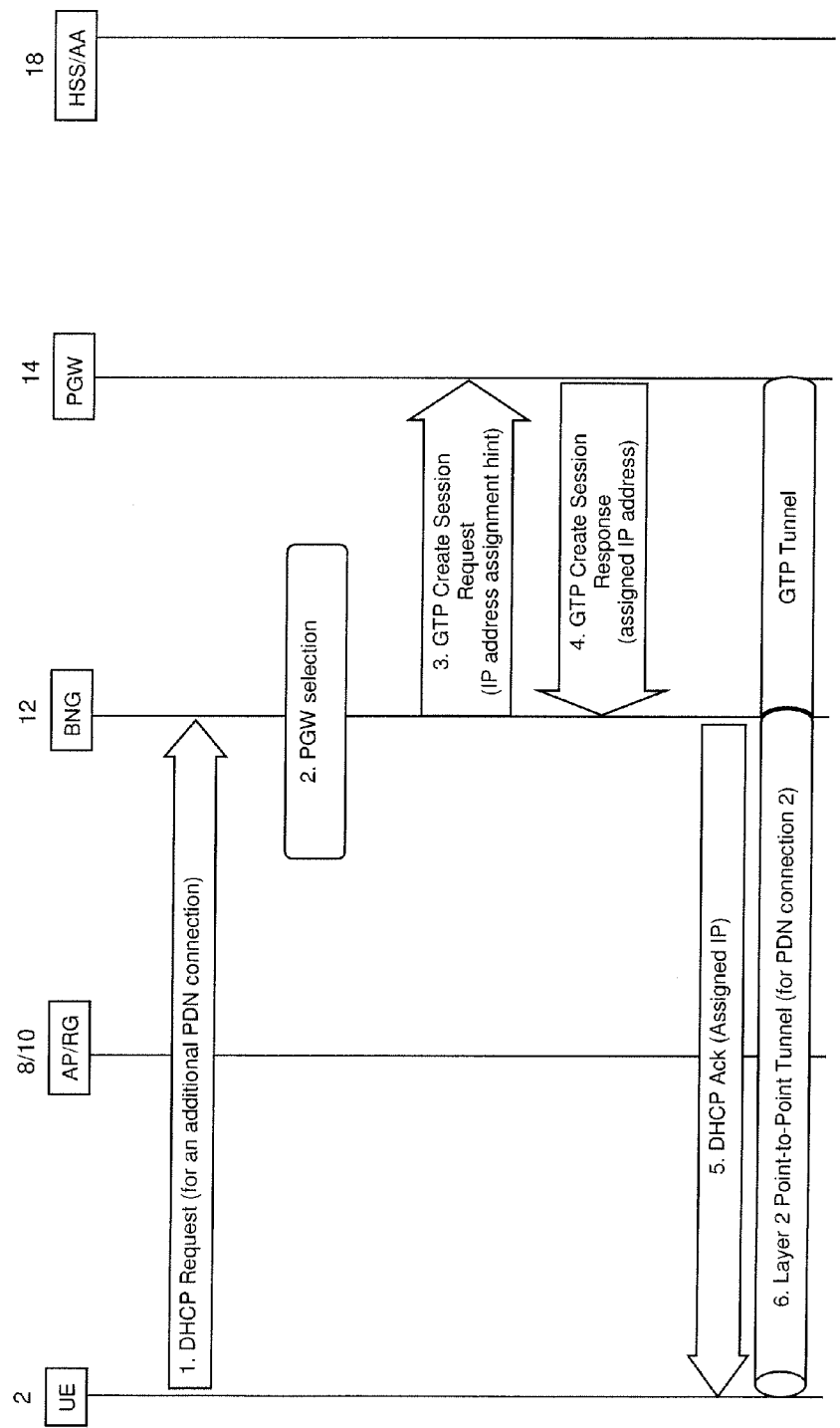
FIG. 5 is a signaling diagram (including actions taken) relating to the setting up of an additional PDN connection.
Figure 6:
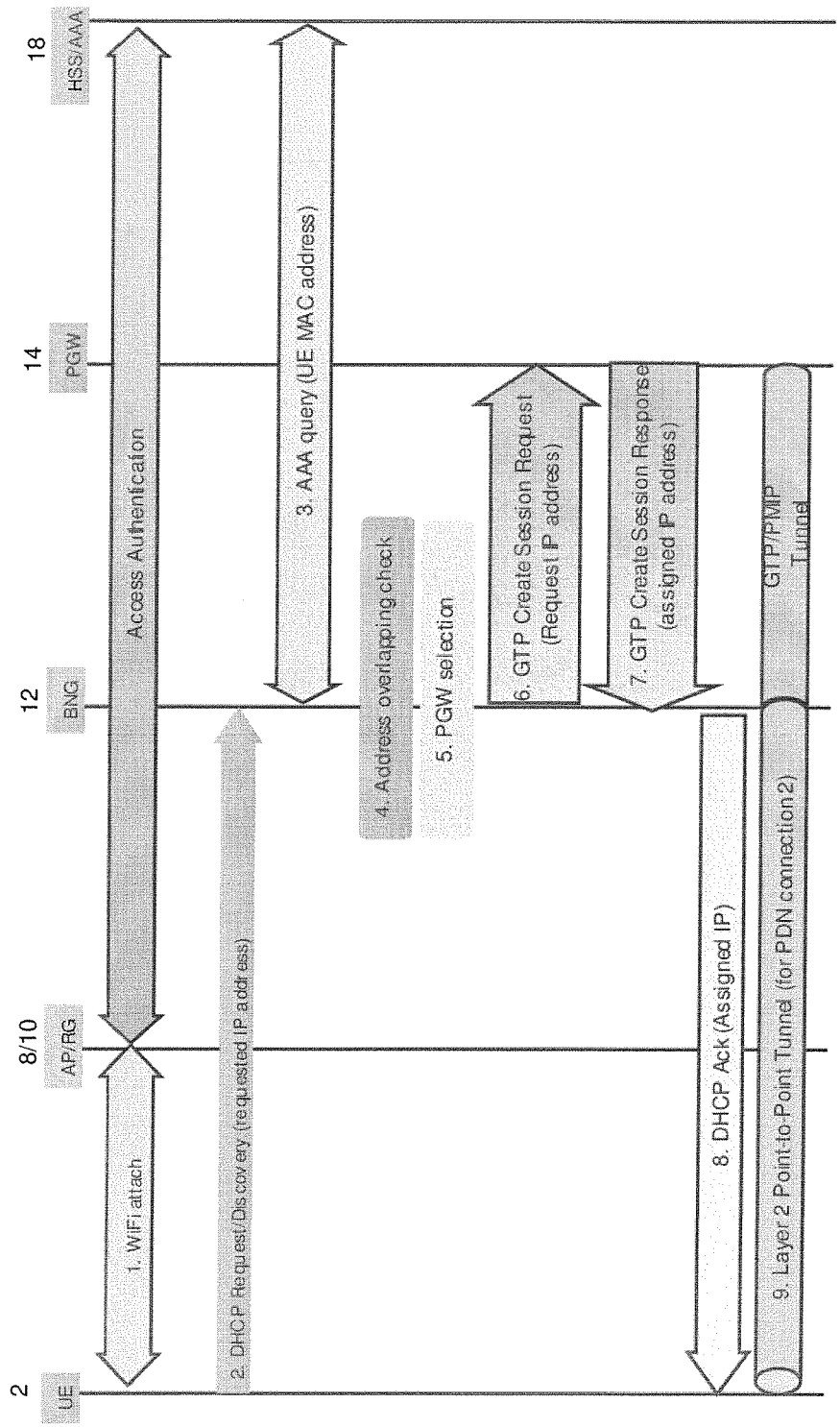
FIG. 6 is a signaling diagram (including actions taken) relating to the handover of a PDN connection from a 3GPP access.

With reference to the signaling flowcharts of FIGS. 4 to 6, there will now be provided a more detailed description of the procedures mentioned above. The basic structure presented in these flowcharts is already part of the 3GPP specifications [3GPP TR 23.839, 3GPP TS 23.402], the novelty according to an embodiment of the present invention relating to the IP address assignments hints provided in the GTP/PMIP tunnel setup (either by way of additional messages, or addition information within existing messages, or a combination of these). For the purposes of this description it will therefore only be necessary to explain the differences between what is proposed according to an embodiment of the present invention, and what is in the 3GPP specifications; the reader is referred to the 3GPP specifications for more information concerning the underlying procedures and processes.

Before a detailed description of the steps and messages illustrated in FIGS. 4 to 6, a brief overview will first be provided.

FIG. 5 corresponds closely to the above-described FIG. 3, in that it illustrates a scenario in which there are existing PDN connections for the UE 2, and where an additional PDN connection for the UE 2 is requested without any constraints on the IP address to be assigned to that additional PDN connection. There is no need in such a scenario for the BNG 12 to perform any check for address overlap or clash, since a new IP address is to be assigned by the PGW 14. The BNG 12 provides address hints to the PGW 14 in order that the PGW 14 can assign the new address without there being an address overlap or clash.

FIG. 6 corresponds to the scenario described above with reference to FIG. 2, in which an existing PDN connection, with an existing associated IP address, is being handed over from the 3GPP access 16 to the BBF access 6. In the example shown in FIG. 6, the handover is requested so as to preserve the assigned IP address when moving from the 3GPP access 16 to the BBF access 6. Therefore, a check is made for address overlap or clash. If there is no clash, then the handover can occur with the existing IP address. If there is a clash, then the UE 2 can choose to perform a procedure such as that illustrated in FIG. 5, which is to set up an additional PDN connection without any constraints on the IP address being assigned, or in other words without IP address preservation so that a new IP address can be assigned.

FIG. 5 is provided for completeness, and illustrates the establishment of the first PDN connection for the UE. In such a scenario, of course, there is no overlap or clash to check for because there is no other IP address already assigned.

With reference again to FIG. 4, the following steps are illustrated:
1. The UE 2 performs a WiFi access authentication and is attached at the BBF access 6. No traffic tunnel is yet set up.
2. In order to set up a PDN connection, the UE 2 sends a DHCP request message with requested APN to the BNG 12.
3. In response to receipt of the DHCP request, the BNG 12 performs an AAA query by using the UE's MAC address. If this is an authenticated 3GPP UE, the AAA returns all additional parameters to the BNG 12 in the AAA query response message.
4. The BNG 12 performs PGW selection based on received APN.
5. The BNG 12 sends a Create Session Request message to the selected PGW 12.
6. When the Create Session Request message is accepted, the PGW 12 allocates an IP address and responds with a Create Session Response message.
7. The BNG 12 continues the DHCP procedure by sending a DHCP Ack message to the UE 2, which includes the assigned IP address.
8. A traffic tunnel between the UE 2 and the BNG 12 is established. An associated GTP tunnel is established between the BNG 12 and the PGW 14 for the PDN connection.

Reference will now be made again to FIG. 5. Before the additional PDN connection over BBF procedure of FIG. 5 is performed, it is assumed that the procedure of FIG. 4 has been performed. In this respect, it is assumed that: the UE 2 has already performed WiFi access authentication; the PDN connection establishment procedure has been performed for the first PDN connection establishment; a traffic tunnel between the UE 2 and the BNG 12 is set up for the first PDN connection; and an associated GTP tunnel has been set up between the BNG 12 and the PGW 14 for the first PDN connection. The following steps are illustrated in FIG. 5:

1. If the UE 2 wishes to set up or establish an additional PDN connection, it sends a DHCP request message with requested APN to the BNG 12.
2. As the BNG 12 knows this is a 3GPP UE from the first PDN connection procedure, it performs PGW selection based on the received APN.
3. The BNG 12 sends a Create Session Request message to the selected PGW. Before doing so, however, the BNG 12 determines or looks up the addresses of the existing PDN connections for the UE 2. In the Create Session Request message, the IP address(es) which have been assigned to the UE 2 for any existing PDN connections are included in the 'IP address hint' Information Element (IE) of the Create Session Request message. The inclusion of the addressing information in this message is novel.
4. When the Create Session Request message is accepted, the PGW 14 allocates a new IP address taking into account the received addressing information from theh BNG 12, so that the new IP address does not overlap or clash with any IP address(es) in the received 'IP address hint' IE. The assigned IP address is returned to the BNG 12 in the Create Session Response message.
5. The BNG 12 continues the DHCP procedure by sending a DHCP Ack message to the UE 2 which includes the assigned IP address.
6. An additional traffic tunnel between the UE 2 and the BNG 12 is established. An associated additional GTP tunnel is established between the BNG 12 and the PGW 14 for the additional PDN connection.

With reference again to FIG. 6, the following steps are illustrated:

1. Before the handover procedure, it is assumed that the UE 2 already has one or more PDN connections established through the 3GPP access 16, and the UE 2 would like to handover one or more of the PDN connections to the BBF access 6. After performing the WiFi access authentication, the UE 2 is attached to the BBF network. No traffic tunnel is yet set up.
2. If the UE 2 wishes to have over one PDN connection to the BBF access 6, it sends a DHCP request message with requested APN and the Requested IP address to the BNG 12. The requested IP address is the IP address assigned to the UE's PDN connection over the 3GPP access 16.
3. Following receipt of the DHCP request, the BNG 12 performs an AAA query using the UE's MAC address. If this is an authenticated 3GPP UE, the AAA returns all additional parameters to the BNG in the AAA query response message.
4. The BNG 12 then performs an address overlapping check; this step is novel. If the requested IP address is determined to overlap or clash with any previous assigned IP address for the same UE 2, the BNG 12 responds to the UE 2 with a DHCP Nak message. This DHCP Nak message is not shown in FIG. 6, but would effectively replace steps 5 to 9 as illustrated in FIG. 6. In this case, the UE 2 may decide to hand over the PDN connection without IP preservation by sending another DHCP request message without "requested IP address" to the BNG 12. Then the BNG 12 could follow the procedure as illustrated in FIG. 5 for setting up an additional PDN connection.
5. If there no IP address overlap or clash was detected in step 4, the BNG 12 performs PGW selection based on received APN.
6. The BNG 12 sends a Create Session Request message with requested IP address to the selected PGW 14, knowing that there will be no clash as a result of the check performed in step 4. There is therefore no need to include any address hints as is the case in step 3 of FIG. 5.
7. When the Create Session Request message is accepted, the PGW 14 allocates the requested IP address and responds with a Create Session Response message sent to the BNG 12.
8. The BNG 12 continues the DHCP procedure by sending a DHCP Ack message to the UE 2, which includes the assigned IP address (which is the same as the requested IP address).
9. A traffic tunnel is established between the UE 2 and the BNG 12. An associated GTP tunnel is established between the BNG 12 and the PGW 14 for the handed-over PDN connection.

In one implementation, the assigned IP address hint IE of step 3 of FIG. 5 contains all the assigned IP addresses for the UE 2. One possible IE format for GTP is illustrated in FIG. 7.

Although the flow charts described above focus on GTP, the procedure for PMIP would be very similar. One possible IE format for PMIPv6 is illustrated in FIG. 8.

It will be appreciated that the address assignment information passed to the PGW 14 can take many different forms. In one example, the address assignment information could include a list of all those addresses already assigned to existing PDN connections for the UE 2. Alternatively, or in addition, the address assignment information could include an address, or a plurality or range of addresses, that the PGW 14 can safely choose from in order to prevent a clash. It is envisaged that there need not be an explicit check made to determine whether there are other active PDN connections in place for the UE 2, it being enough that the address information sent to the PGW 14 is specified in a manner to prevent any clash being possible. For example, the BNG 12 could cycle through a plurality of IP addresses, simply selecting the next IP address of the plurality to send to the PGW 14 as the address to be assigned, without making an explicit check that the IP address is still active or in use.

It is described above with reference to FIG. 6 that, if in step 4 it is determined that the IP address being handed over clashes with an existing IP address for the UE 2, then the handover is simply refused, allowing the UE 2 the opportunity to perform a separate procedure as illustrated in FIG. 5 to request an additional PDN connection. It is also possible effectively to amalgamate the FIG. 6 procedure with the FIG. 5 procedure, so that the initial DHCP request of step 2 FIG. 6 still includes the existing IP address as a requested IP address for the new connection, but which also contains an indication that IP address preservation is preferred but not required. Therefore, should a clash be detected in step 4 of FIG. 6, the BNG 12 need to reject the handover outright (requiring a separate procedure to be performed thereafter), but instead could at that point treat the already-received DHCP request as a request for an additional PDN connection without address preservation, or in other words jump to performing the procedure of FIG. 5. However, as a result of this, the IP address for the PDN connection would change, which would mean that mobility is broken, though this may be considered acceptable to the user in certain situations.

Figure 9:
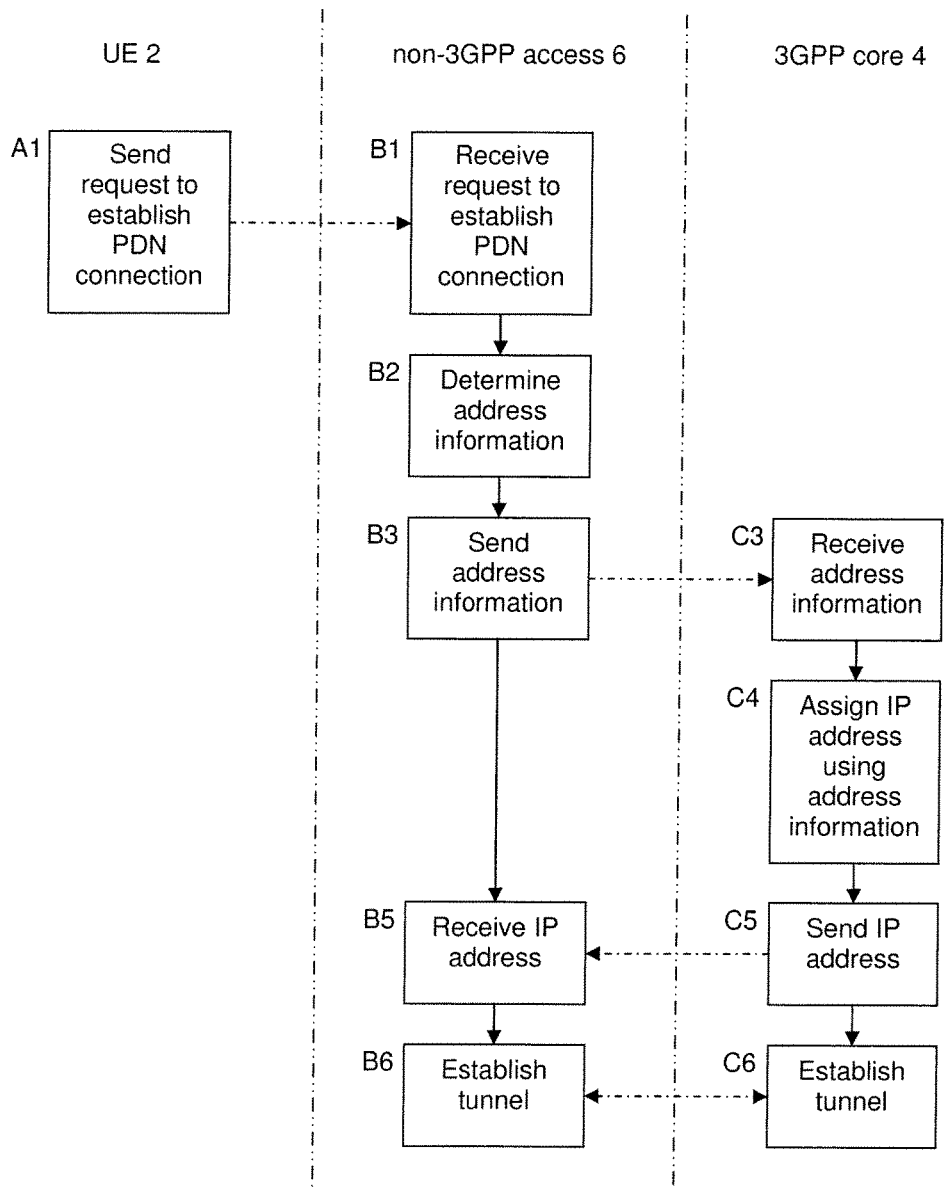
FIG. 9 is a schematic flow chart illustrating a method performed by nodes in an embodiment of the present invention.
Figure 10:
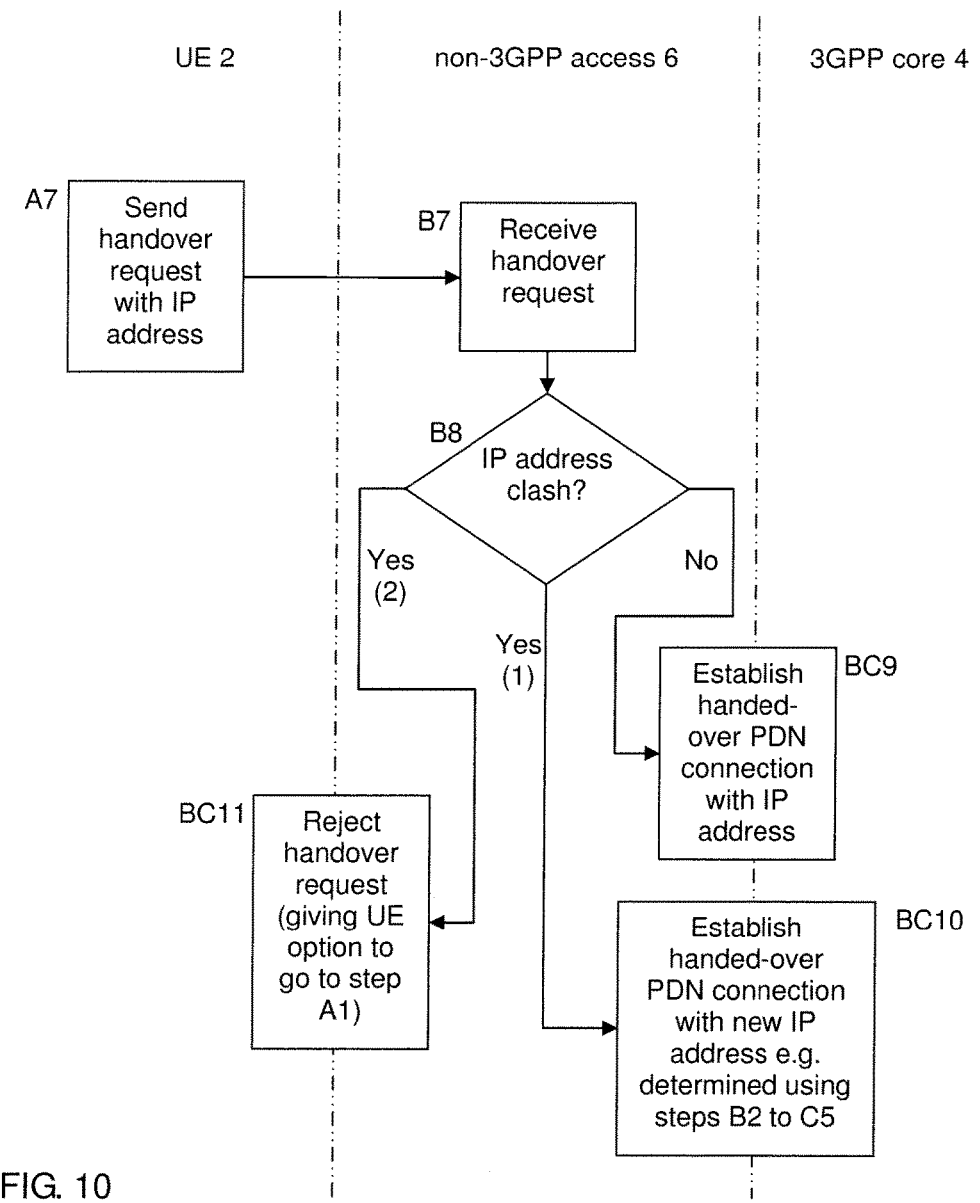
FIG. 10 is a schematic flow chart illustrating a method performed by nodes in an embodiment of the present invention.

An overview of a method embodying the present invention will now be presented with reference to FIGS. 9 and 10. FIG. 9 corresponds generally to FIGS. 3 and 5, while FIG. 10 corresponds generally to FIG. 6. A method is provided according to an embodiment of the present invention for use in establishing a packet data network (PDN) connection from a UE 2 to a 3GPP core network 4 via a non-3GPP access network 6. In step A1 a request to establish the PDN connection is sent from the UE 2 and in step B1 this request is received at the non-3GPP access network 6. In response to this, the non-3GPP access network 6 communicates with the 3GPP core network 4 to establish a tunnel for the PDN connection between the non-3GPP access network 6 and the 3GPP core network 4 and to assign an IP address for the tunnel, which is discussed in more detail below. The tunnel IP address is used subsequently by the non-3GPP access network 6 to distinguish between the new PDN connection tunnel and at least one other such PDN connection tunnel already established for the UE 2. The 3GPP core network 4 is responsible for assigning the IP address. In step B2, the non-3GPP access network 6 determines address information which will enable the 3GPP core network 4 to assign an IP address for the new PDN connection tunnel that does not clash with an IP address already assigned to any of the at least one another such PDN connection tunnel. In step B3, the non-3GPP access network 6 sends this address information from the non-3GPP access network 6 to the 3GPP core network 4, and in step C3 the address information is received by the 3GPP core network 4. In step C4 the 3GPP core network 4 uses the address information to assign an IP address for the new PDN connection tunnel that does not clash with an IP address already assigned to any of the at least one another such PDN connection tunnel. In step C5 the 3GPP core network 4 sends the assigned IP address to the non-3GPP access network 6, and in step B5 the IP address is received at the non-3GPP access network 6. In steps B6 and C6 respectively, the non-3GPP access network 6 and 3GPP core network 4 cooperate to establish the tunnel.

FIG. 10 illustrates the steps taken in a handover situation. In step A7 the UE 2 sends a request to hand over an existing PDN connection for the UE 2 from a 3GPP access network to the non-3GPP access network 6. This request is received at the non-3GPP access network 5 in step B7. In step B8 it is determined at the non-3GPP access network 6 whether the IP address of the PDN connection being handed over clashes with an IP address already assigned to a PDN connection for the UE via the non-3GPP access network. If a clash is not detected then in step BC9 the non-3GPP access network 6 and the 3GPP core network 4 cooperate to establish a handed-over PDN connection via the non-3GPP access network using the IP address of the PDN connection being handed over. If a clash is detected, then the handover request may simply be rejected (step BC11), allowing the UE 2 the option to request a new PDN connection by performing the method starting at step A1 of FIG. 9. Alternatively, if a clash is detected in step B8 and if the request received in step B7 so indicates, the non-3GPP access network 6 and the 3GPP core network may cooperate in step BC10 to establish a handed-over PDN connection via the non-3GPP access network 6 without preservation of the IP address of the PDN connection being handed over; this may involve determining and sending address information to the 3GPP core network in a manner as set out in steps B2, B3, C3, C4, C5 and B5 of FIG. 9.

Figure 11:
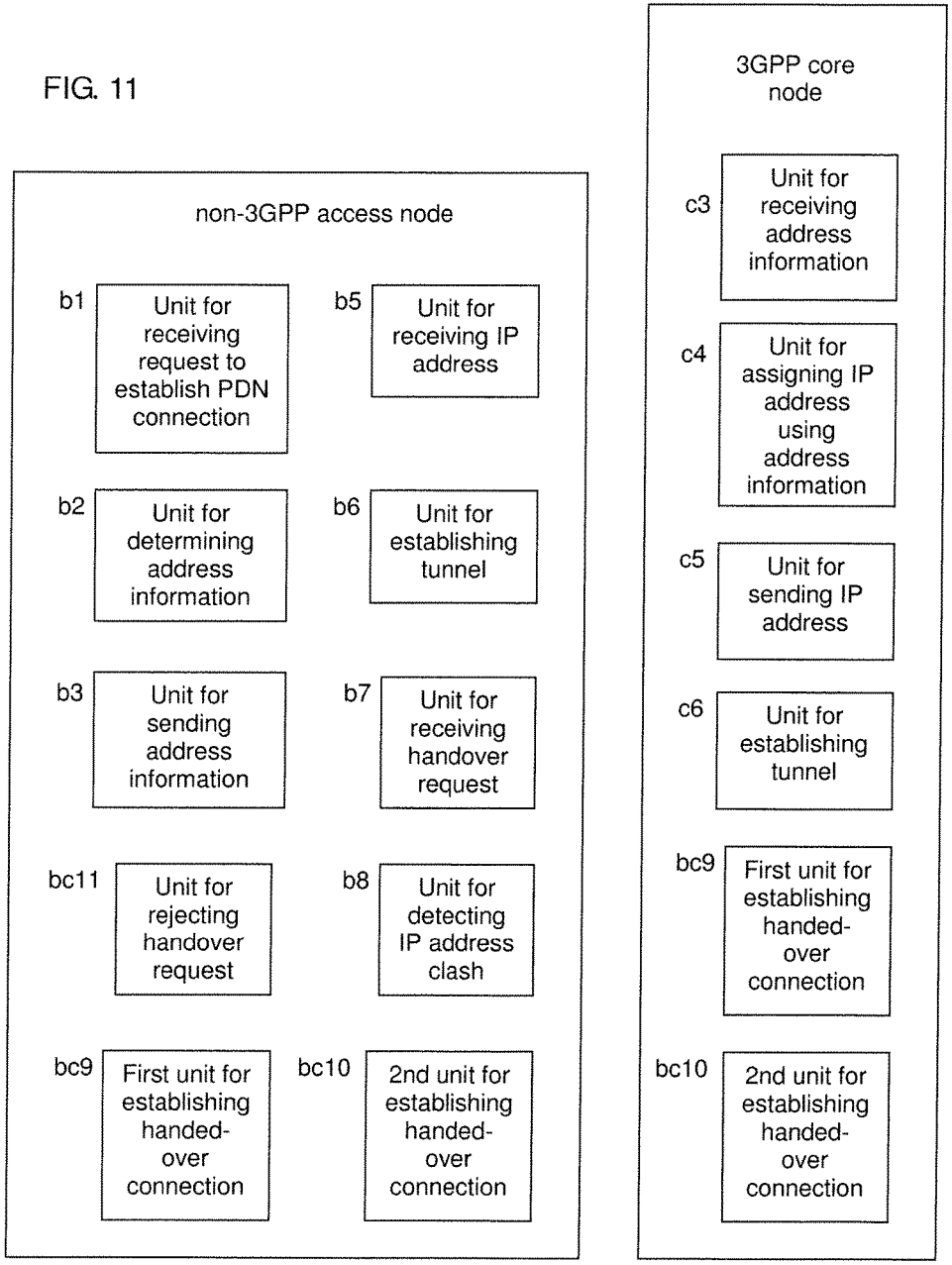
FIG. 11 is a schematic block diagram illustrating apparatus for performing a method embodying the present invention.

FIG. 11 is a schematic block diagram illustrating apparatus for use to perform the methods of FIGS. 9 and 10. For each of the functional block of FIGS. 9 and 10, there is a corresponding processing unit illustrated in FIG. 11 for performing the function represented by that functional block; like reference numerals have been applied, so that for example processing unit b1 is provided for performing the function of step B1.

An embodiment of the present invention provides a method to assign an IP address given certain restrictions. These restrictions might be required in certain situations where the device receiving the address, or the intermediate network, for some reason cannot handle any address. There is a particular need for such method in a S2a-based strategy for 3GPP-BBF interworking.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. Any appended claims now or in future are to be interpreted as covering an operating program by itself, or as a record on a carrier, or as a signal, or in any other form.

Figure 12:
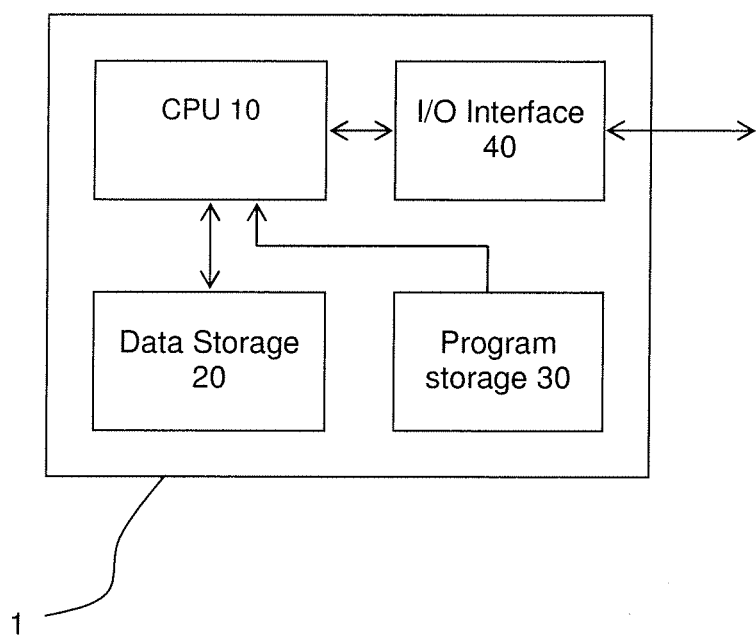
FIG. 12 is a schematic illustration of a node in which a method embodying the present invention can be implemented.

FIG. 12 is a schematic illustration of a node 1 in which a method embodying the present invention can be implemented. A computer program for controlling the node 1 to carry out a method embodying the present invention is stored in a program storage 30. Data used during the performance of a method embodying the present invention is stored in a data storage 20. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

The appended signaling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Likewise, an embodiment of the present invention is not restricted to a non-3GPP access network such as the BBF, but is applicable to any non-3GPP access network. Therefore, in particular, the terms 3GPP and BBF and associated or related terms used in the above description and in the appended drawings and any appended claims now or in the future are to be interpreted accordingly.

The invention claimed is:

1. A method for establishing a packet data network (PDN) connection from a user equipment (UE) to a 3GPP core network via a non-3GPP access network, the method comprising:
   receiving, by the non-3GPP access network, a request to establish the PDN connection;
   communicating, by the non-3GPP access network, with the 3GPP core network to establish a tunnel for the PDN connection between the non-3GPP access network and the 3GPP core network and to assign an internet protocol (IP) address for the tunnel, wherein
      the non-3GPP access network distinguishes between the PDN connection tunnel and at least one other such PDN connection tunnel already established for the UE based on the tunnel IP address, and
      the 3GPP core network is responsible for assigning the IP address;
   determining, by the non-3GPP access network, which IP addresses have been assigned to the at least one other such PDN connection tunnel already established for the UE;
   determining, by the non-3GPP access network, address information comprising at least one IP address not to be assigned by the 3GPP core network to the PDN connection tunnel, said at least one IP address comprising the determined IP addresses assigned to the at least one other such PDN connection tunnel already established for the UE; and
   sending, by the non-3GPP access network, the determined address information to the 3GPP core network as part of the communicating step, wherein the determined address information enables the 3GPP core network to assign an IP address for the PDN connection tunnel that does not clash with the determined IP addresses assigned to the at least one other such PDN connection tunnel already established for the UE.

2. The method as claimed in claim 1, wherein the determined address information further comprises at least one IP address from which the 3GPP core network chooses to assign to the tunnel, or at least information enabling the at least one IP address to be determined by the 3GPP core network.

3. The method as claimed in claim 1, comprising receiving, by the non-3GPP access network, a request to hand over an existing PDN connection for the UE from a 3GPP access network to the non-3GPP access network,
   determining, by the non-3GPP access network, whether the IP address of the PDN connection being handed over clashes with an IP address already assigned to a PDN connection for the UE via the non-3GPP access network, and
   establishing, by the non-3GPP access network, when a clash is not detected, a handed-over PDN connection via the non-3GPP access network using the IP address of the PDN connection being handed over.

4. The method as claimed in claim 3, wherein, when the clash is detected, the handover request is rejected.

5. The method as claimed in claim 3, wherein, when the clash is detected then: communicating, by the non-3gpp access network, with the 3GPP core network to establish a handed-over PDN connection via the non-3GPP access network without preservation of the IP address of the PDN connection being handed over.

6. The method as claimed in claim 5, wherein the communicating step comprises sending, by the non-3GPP access network, address information to the 3GPP core network, the address information enabling the 3GPP core network to assign an IP address for the handed-over PDN connection that does not clash with an IP address already assigned to a PDN connection for the UE via the non-3GPP access network.

7. The method as claimed in claim 1, wherein the steps performed by the non-3GPP access network are performed by a gateway node of the non-3GPP access network, and wherein the steps performed by the 3GPP core network are performed by a gateway node of the 3GPP network.

8. The method as claimed in claim 7, wherein the non-3GPP access network is a BroadBand Forum (BBF) network.

9. The method as claimed in claim 8, wherein the non-3GPP gateway node is a Border Network Gateway node of the BBF network.

10. The method as claimed in claim 1, wherein the 3GPP gateway node is a PDN Gateway node of the 3GPP core network.

11. An apparatus for establishing a packet data network (PDN)-connection from a user equipment (UE) to a 3GPP core network via a non-3GPP access network, the apparatus being for use at the non-3GPP access network and comprising
   a processor,
   a data storage coupled with the processor, wherein the processor is configured to:
   receive a request to establish the PDN connection;
   communicate with the 3GPP core network to establish a tunnel for the PDN connection between the non-3GPP access network and the 3GPP core network and to assign an internet protocol (IP) address for the tunnel, wherein
      the non-3GPP access network to distinguish between the PDN connection tunnel and at least one other such PDN connection tunnel already established for the UE based on the tunnel IP address, and
      the 3GPP core network is responsible for assigning the IP address;
   determine which IP addresses have been assigned to the at least one other such PDN connection tunnel already established for the UE;
   determine address information comprising at least one IP address not to be assigned by the 3GPP core network to the PDN connection tunnel, said at least one IP address comprising the determined IP addresses assigned to the at least one other such PDN connection tunnel already established for the UE; and
   send the determined address information to the 3GPP core network, wherein the address information enables the 3GPP core network to assign an IP address for the PDN connection tunnel that does not clash with the determined IP addresses assigned to the at least one other such PDN connection tunnel already established for the UE.

12. A method for establishing a packet data network (PDN)-connection from a user equipment (UE) to a 3GPP core network via a non-3GPP access network, the method comprising:
   communicating, by the 3GPP core network, with the non-3GPP access network to establish a tunnel for the PDN connection between the non-3GPP access network and the 3GPP core network and to assign an internet protocol (IP) address for the tunnel, wherein the non-3GPP access network distinguishes between the PDN connection tunnel and at least one other such PDN connection tunnel already established for the UE based on the tunnel IP address, and the 3GPP core network is responsible for assigning the IP address;

receiving, by the 3GPP core network, address information transmitted from the non-3GPP access network as part of the communicating step, wherein the received address information comprises at least one IP address not to be assigned by the 3GPP core network and enables the 3GPP core network to assign an IP address for the PDN connection tunnel that does not clash with IP addresses assigned to the at least one other such PDN connection tunnel already established for the UE; and assigning, by the 3GPP access network, an IP address for the PDN connection tunnel between the non-3GPP access network and the 3GPP core network based on the received address information.

13. An apparatus for establishing a packet data network (PDN) connection from a user equipment (UE) to a 3GPP core network via a non-3GPP access network, the apparatus being for use at the 3GPP core network and comprising:

a processor, wherein the processor is configured to:

communicate with the non-3GPP access network to establish a tunnel for the PDN connection between the non-3GPP access network and the 3GPP core network and to assign an internet protocol (IP) address for the tunnel, wherein the non-3GPP access network to distinguish between the PDN connection tunnel and at least one other such PDN connection tunnel already established for the UE based on the tunnel IP address, and the 3GPP core network is responsible for assigning the IP address;

receive address information transmitted from the non-3GPP access network, wherein the received address information comprises at least one IP address not to be assigned by the 3GPP core network and enables the 3GPP core network to assign an IP address for the PDN connection tunnel that does not clash with IP addresses assigned to the at least one other such PDN connection tunnel already established for the UE; and assign an IP address for the PDN connection tunnel between the non-3GPP access network and the 3GPP core network based on the received address information.

14. A program comprising computer executable instructions stored on a non-transitory computer readable medium, which when executed by a computer, cause the computer to perform each of the method steps of claim 1.

15. A method for establishing a packet data network (PDN) connection from a user equipment (UE) to a 3GPP core network via a non-3GPP access network, the method comprising:

receiving, by the non-3GPP access network, a request to establish the PDN connection;

communicating, by the non-3GPP access network, with the 3GPP core network to establish a tunnel for the PDN connection between the non-3GPP access network and the 3GPP core network and to assign an internet protocol (IP) address for the tunnel, wherein the non-3GPP access network distinguishing between the PDN connection tunnel and at least one other such PDN connection tunnel already established for the UE based on the tunnel IP address, and the 3GPP core network is responsible for assigning the IP address;

determining, by the non-3GPP access network, which IP addresses have been assigned to the at least one other such PDN connection tunnel already established for the UE;

determining, by the non-3GPP access network, address information comprising a plurality of preferable IP addresses from which the IP address for the PDN connection tunnel is to be determined by the 3GPP core network, said plurality of preferable IP addresses not including the determined IP addresses assigned to the at least one other such PDN connection tunnel already established for the UE; and sending, by the non-3GPP access network, the address information to the 3GPP core network as part of the communicating step, wherein the address information enables the 3GPP core network to assign an IP address for the PDN connection tunnel that does not clash with the determined IP addresses assigned to the at least one other such PDN connection tunnel already established for the UE.

* * * * *